(12) United States Patent
Yasui

(10) Patent No.: US 8,606,475 B2
(45) Date of Patent: Dec. 10, 2013

(54) SHIFT RANGE SWITCHING APPARATUS, PARKING LOCK APPARATUS AND ENGAGEMENT SWITCHING APPARATUS FOR USE IN VEHICLE

(75) Inventor: Kouji Yasui, Hokinan (JP)

(73) Assignee: Denso Corporation, Kariya (JP)

( * ) Notice: Subject to any disclaimer, the term of this patent is extended or adjusted under 35 U.S.C. 154(b) by 439 days.

(21) Appl. No.: 12/791,192

(22) Filed: Jun. 1, 2010

(65) Prior Publication Data
US 2010/0312424 A1 Dec. 9, 2010

(30) Foreign Application Priority Data

Jun. 4, 2009 (JP) ................................. 2009-135154
Jan. 13, 2010 (JP) ................................. 2010-005008

(51) Int. Cl.
*G06F 7/00* (2006.01)
(52) U.S. Cl.
USPC .................... 701/62; 701/22; 701/51; 701/64
(58) Field of Classification Search
USPC ........................................ 701/62–64; 477/92
See application file for complete search history.

(56) References Cited

U.S. PATENT DOCUMENTS

| 2005/0209047 A1* | 9/2005 | Berger et al. ................. 477/121 |
| 2007/0179018 A1 | 8/2007 | Endo et al. |
| 2008/0103665 A1 | 5/2008 | Kubonoya et al. |
| 2008/0113848 A1* | 5/2008 | Inoue et al. ...................... 477/98 |
| 2009/0158790 A1* | 6/2009 | Oliver ............................. 70/202 |

FOREIGN PATENT DOCUMENTS

| JP | 2006-336710 | 12/2006 |
| JP | 2007-032819 | 2/2007 |
| JP | 2007-205371 | 8/2007 |
| JP | 2008-106826 | 5/2008 |
| JP | 2008-106921 | 5/2008 |
| JP | 2008-121868 | 5/2008 |

OTHER PUBLICATIONS

Japanese Office Action dated Apr. 19, 2011, issued in corresponding Japanese Application No. 2010-005008 with English Translation.

* cited by examiner

*Primary Examiner* — James Trammell
*Assistant Examiner* — Jerrah Edwards
(74) *Attorney, Agent, or Firm* — Nixon & Vanderhye P.C.

(57) ABSTRACT

The shift range switching apparatus includes a switching mechanism driven to switch a shift range of an automatic transmission, a drive section which drives the switching mechanism, an operating member operated to switch the shift range, a control section to control the drive section such that the shift range is switched in accordance with a switching operation by a vehicle driver, an abnormality detection section configured to cause the drive section to drive the switching mechanism when a predetermined abnormality detection condition is satisfied indicating that the vehicle driver is unlikely to operate the operating member, a driving state detection section to detect a driving state of the drive section after the abnormality detection section causes the drive section to drive, and an abnormality determination section to determine whether the drive section is abnormal in accordance with a detection result by the driving state detection section.

11 Claims, 14 Drawing Sheets

SHIFT RANGE SWITCHING APPARATUS, PARKING LOCK APPARATUS AND ENGAGEMENT SWITCHING APPARATUS FOR USE IN VEHICLE

This application claims priority to Japanese Patent Applications No. 2009-135154 filed on Jun. 4, 2009, and No. 2010-5008, filed Jan. 13, 2010, the entire contents of each of which are hereby incorporated by reference.

BACKGROUND OF THE INVENTION

1. Field of the Invention

The present invention relates to a shift range switching apparatus for switching the shift range of an automatic transmission, a parking lock apparatus and an engagement switching apparatus for a vehicle.

2. Description of Related Art

In recent years, there are used shift range switching apparatuses constituted including a shift range switching mechanism mounted on an automatic transmission of a vehicle, a drive source (an electric motor, for example) to drive the shift range switching mechanism, and a control device to control the drive source in accordance with a shift lever operation by a vehicle driver to switch the shift range of the automatic transmission as desired.

Some of such shift range switching apparatuses have means to detect abnormality in the drive source by detecting whether or not the shift range has been switched as commanded by the vehicle driver's shift lever operation. For example, refer to Japanese Patent Application Laid-Open No. 2007-32819.

On the other hand, it is known to provide an electric vehicle or a hybrid vehicle not having an automatic transmission with a parking lock apparatus which includes a parking lock mechanism mounted on the drive apparatus of the vehicle to switch between the parking lock state and non-parking lock state. Further, it is known to provide an electric vehicle which includes in-wheel motors serving a drive apparatus of the electric vehicle with a parking lock apparatus to prevent the axle shaft of the vehicle from rotating.

However, the technique as disclosed in the above patent document has a problem in that abnormality in the drive source cannot be detected until the vehicle driver operates the shift lever. On the other hand, the above electric vehicle or hybrid vehicle not having an automatic transmission and provided with the parking lock apparatus has a problem that it is not possible to detect abnormality in the drive source unless the vehicle driver operates the shift lever and performs a parking lock operation.

SUMMARY OF THE INVENTION

The present invention provides a shift range switching apparatus comprising:

a switching mechanism driven to switch a shift range of an automatic transmission of a vehicle;

a drive section which operates as a drive source to drive the switching mechanism;

an operating member operated to switch the shift range;

a control section to control the drive section such that the shift range is switched in accordance with a switching operation performed by a vehicle driver by means of the operating member;

an abnormality detection section configured to perform an abnormality detecting operation to cause the drive section to drive the switching mechanism when a predetermined abnormality detection condition is satisfied indicating that the vehicle driver is unlikely to operate the operating member;

a driving state detection section to detect a driving state of the drive section after the abnormality detection section causes the drive section to drive the switching mechanism; and an abnormality determination section to determine whether or not the drive section is abnormal in accordance with a detection result by the driving state detection section.

The present invention also provides a parking lock apparatus comprising:

a switching mechanism driven to select between a parking lock state in which a drive apparatus of a vehicle is inhibited from driving wheels of the vehicle and a non-parking lock state in which the drive apparatus is allowed to drive the wheels of the vehicle;

a drive section to drive the switching mechanism;

an operating member operated to select between the parking lock state and the non-parking lock state;

a control section to control the drive section such that one of the parking lock state and the non-parking lock state is in effect in accordance with a switching operation performed by a vehicle driver by means of the operating member;

an abnormality detection section configured to perform an abnormality detecting operation to cause the drive section to drive the switching mechanism when a predetermined abnormality detection condition is satisfied indicating that the vehicle driver is not likely to operate the operating member;

a driving state detection section to detect a driving state of the drive section after the abnormality detection section causes the drive section to drive the switching mechanism; and an abnormality determination section to determine whether or not the drive section is abnormal in accordance with a detection result by the driving state detection section.

The present invention also provides an engagement switching element for use in a vehicle comprising:

a plate-like member having at least one recess formed at a peripheral portion thereof and rotatable around an rotation shaft thereof;

an engagement member disposed engageably with the recess;

an operating member operated to select between an engaged state in which the engagement member is engaged in the recess and a disengaged state in which the engagement member is disengaged from the recess;

a drive section to drive one of the plate-like member and the engagement member in order to bring the plate like-member and the engagement member into the engaged state or disengaged state in accordance with a switching operation performed by a vehicle driver by means of the operating member;

an abnormality detection section configured to, when a predetermined abnormality detection condition is satisfied indicating that the vehicle driver is unlikely to operate the operating member, cause the drive section to drive by such an amount that the plate-like member and the engagement member are maintained in the engaged state when the plate-like member and the engagement member have been in the engaged state or in the disengaged state when the plate-like member and the engagement member have been in the disengaged state;

a driving state detection section to detect a driving state of the drive section after the abnormality detection section causes the drive section to drive one of the plate-like member and the engagement member; and an abnormality determination section to determine whether or not the drive section is abnormal in accordance with a detection result by the driving state detection section.

According to the present invention, it is possible to detect an occurrence of abnormality in the drive source for driving the switching mechanism for use in a vehicle which operates in accordance with a vehicle driver's switching operation, before the vehicle driver performs the switching operation.

Other advantages and features of the invention will become apparent from the following description including the drawings and claims.

PREFERRED EMBODIMENTS OF THE INVENTION

First Embodiment

Figure 1:
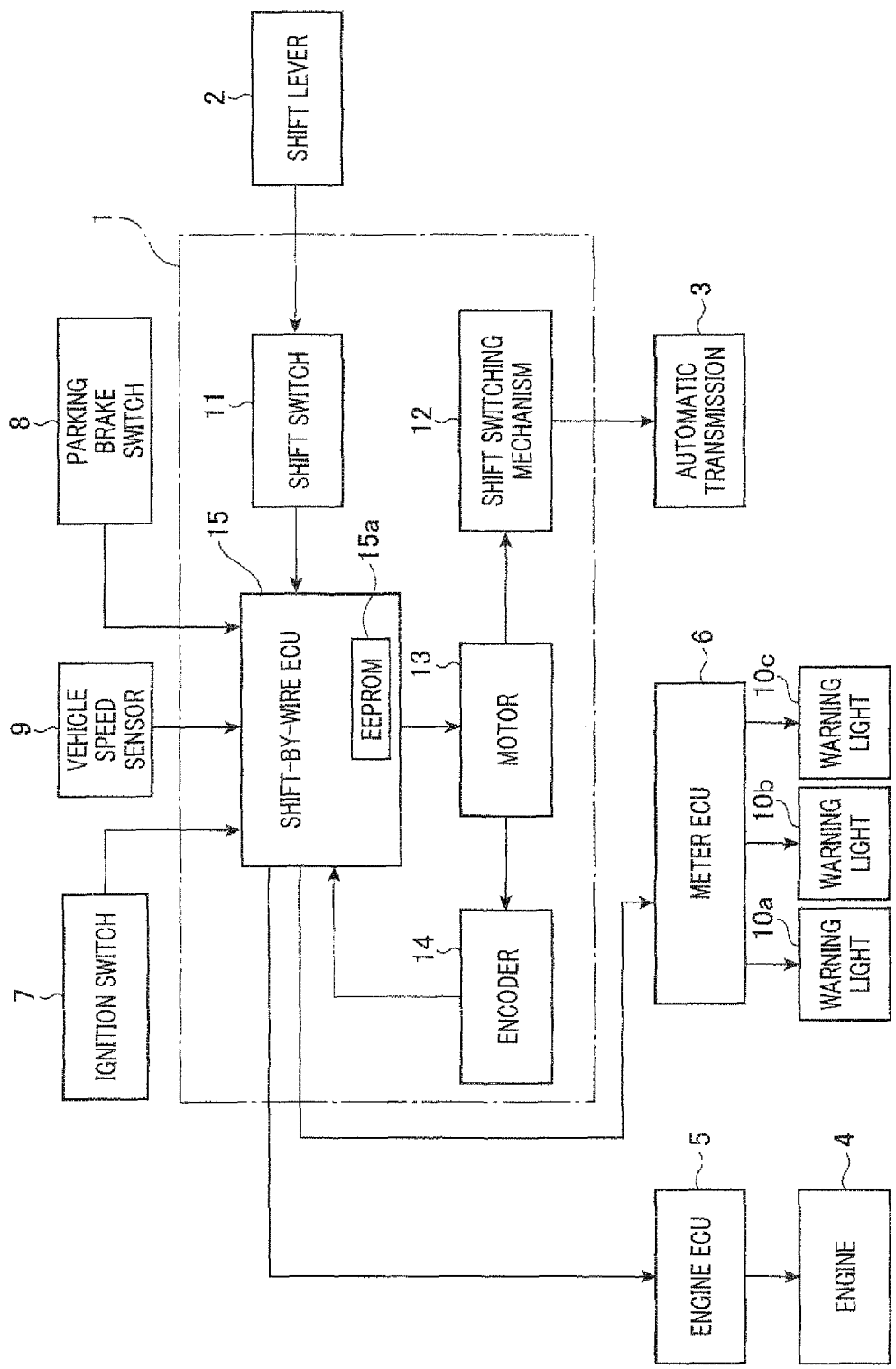
FIG. 1 is a block diagram showing the electrical structure of a shift range switching apparatus 1 as a first embodiment of the invention.
Figure 2:
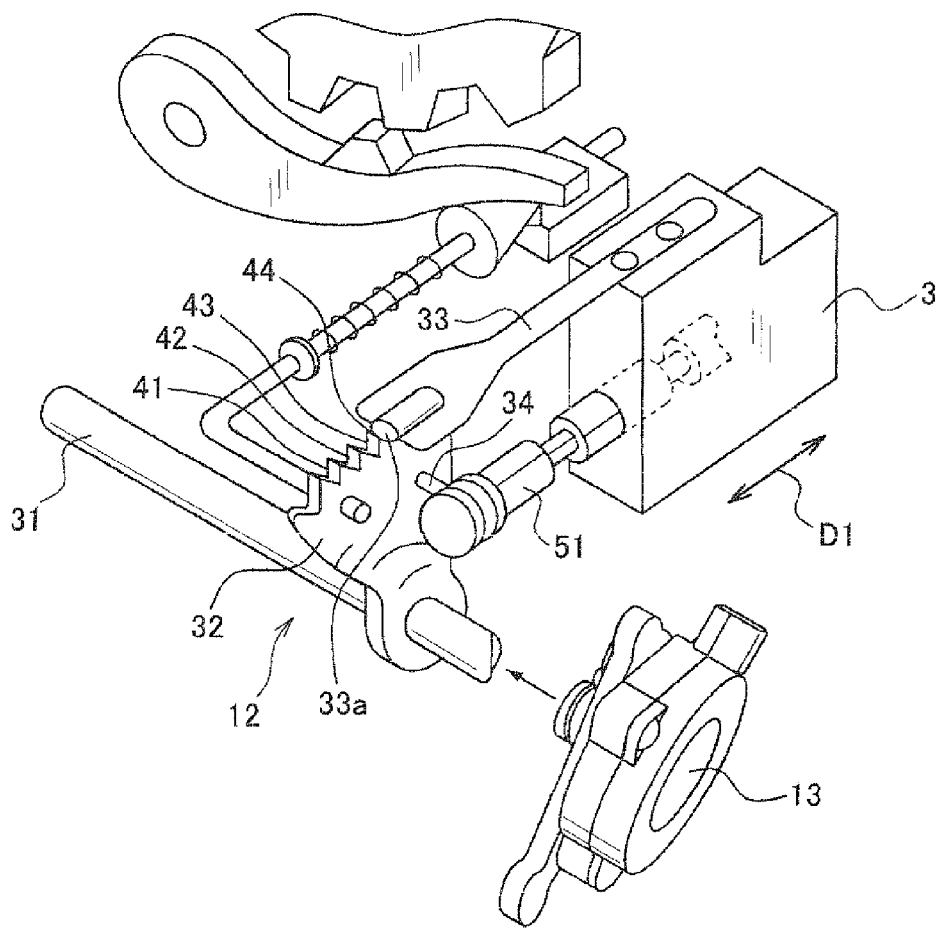
FIG. 2 is a perspective view showing the structure of a shift switching mechanism 12 included in the shift range switching apparatus 1.

FIG. 1 is a block diagram showing the electrical structure of a shift range switching apparatus 1 as a first embodiment of the invention, and FIG. 2 is a perspective view showing the structure of a shift switching mechanism 12 including the shift range switching apparatus 1.

The shift range switching apparatus 1 includes a shift switch 11, the shift switching mechanism 12, a motor 13, an encoder 14 and a shift-by-wire ECU 15. The shift switch 11 detects the shift position of a shift lever 2 which the vehicle driver can set to one of the P-range, R-range, N-range and D-range. The shift switching mechanism 12 is coupled to an automatic transmission 3 to switch the shift range of the automatic transmission 3 to one of the P-range, R-range, N-range and D-range. The motor 13 drives the shift switching mechanism 12 to switch the shift range. The encoder 14 detects the rotational position of the motor 13. The shift-by-wire ECU 15 controls the rotation of the motor 13.

The shift-by-wire ECU 15 is communicably connected with an engine ECU 5 which controls an engine 4 of a vehicle, and a meter ECU 6 which is mounted on an instrument panel (not shown), and controls a display section (not shown) which indicates various states of the vehicle. The shift-by-wire ECU 15 receives an output signal of an ignition switch 7 of the vehicle, an output signal of a parking brake switch 8 which detects the operation state of a parking brake (not shown) of the vehicle, and an output signal of a vehicle speed sensor 9 which detects the running speed of the vehicle.

The shift-by-wire ECU 15 includes an EEPROM 15a capable of holding data written therein even when not supplied with electric power. The EEPROM 15a stores flags F1 and F2. The flag F1 is set if there arises abnormality in the motor 13 when the shift of the automatic transmission is at the D-range. The flag F2 is set to indicate that there is abnormality in the motor 13 when the shift range is at the P-range. Hereinafter, the flag F1 may be referred to as "D-range motor abnormality flag F1", and the flag F2 may be referred to as "P-range motor abnormality flag F2". To set each of the flags F1 and F2, its value is set to 1, and to clear each of the flags F1 and F2, its value is set to 0.

The meter ECU 6 is connected with warning lights 10a, 10b and 10c installed in the instrument panel. The warning light 10a is turned on to induce the vehicle driver to stop the vehicle and operate the parking brake. The warning light 10b is turned on to indicate occurrence of abnormality in the shift range switching apparatus 1. The warning light 10c is turned on to indicate that the shift range switching apparatus 1 has a tendency to be abnormal.

As shown in FIG. 2, the shift switching mechanism 12 is constituted of a drive shaft 31, a detent plate 32, a detent spring 33 and a pin 34. Of these components, the drive shaft 31 is fixed to the output shaft of the motor 13 to be driven to rotate by the motor 13.

The detent plate 32, which is a plate-like member having a roughly sector surface, is fixed to the drive shaft 31 at the apex portion of the sector surface such that its sector surface is substantially orthogonal to the axis of the drive shaft 31. The detent plate 32 includes a plurality of (four in this embodiment) recesses 41, 42, 43 and 44 formed along the arc portion of the sector surface thereof in the circumferential direction. The recesses 41, 42, 43 and 44 are provided for the P-range, R-range N-range and D range, respectively.

The detent spring 33, which is a leaf spring, is fixed with the automatic transmission 3 at one end thereof, and attached with a roller 33a at the other end thereof. The roller 33a is shaped to be engageable to the recesses 41, 42, 43 and 44, and supported by the detent spring 33 so as to be rotatable on its axis substantially parallel to the axis of the drive shaft 31. The detent spring 33 is disposed so as to press the arc portion of the detent plate 32 from upward through the roller 33a.

The pin 34 is fixed to the sector surface of the detent plate 32 and one end thereof, and fixed to a manual valve 51 of the automatic transmission 3 at the other end thereof. The manual valve 51 is disposed so as to be reciprocatably move in the automatic transmission 3 along the movement direction D1. The automatic transmission 3 is configured to switch the shift range in accordance with the movement position of the manual valve 51.

In the shift switching mechanism 12 having the above structure, since the rotational position of the detent plate 32 varies as the drive shaft 31 is driven to rotate by the motor 13, it is possible to reciprocatably move the manual valve 51 along the movement direction D1. The position at which the roller 33a abuts against the detent plate 32 at the arc portion of the detent plate 32 depends on the rotational position of the detent plate 32. Accordingly, it is possible to bring the roller 33a in the state in which it is engaged in one of the recesses 41, 42, 43 and 44 (which may be referred to as "roller engaged state" hereinafter). When the motor 13 is stopped in the roller engaged state, the roller engaged state is held, and the rotational position of the detent plate 32 is fixed. That is, the movement position of the manual valve 51 is determined in this state, and the shift range of the automatic transmission 3 is fixed in accordance with the movement position of the manual valve 51.

The shift-by-wire ECU 15 of the shift range switching apparatus 1 performs an abnormality detection process to detect abnormality in the motor 13, and a fail-safe process to reduce the effect of abnormality occurred in the motor 13 to a minimum.

Figure 3:
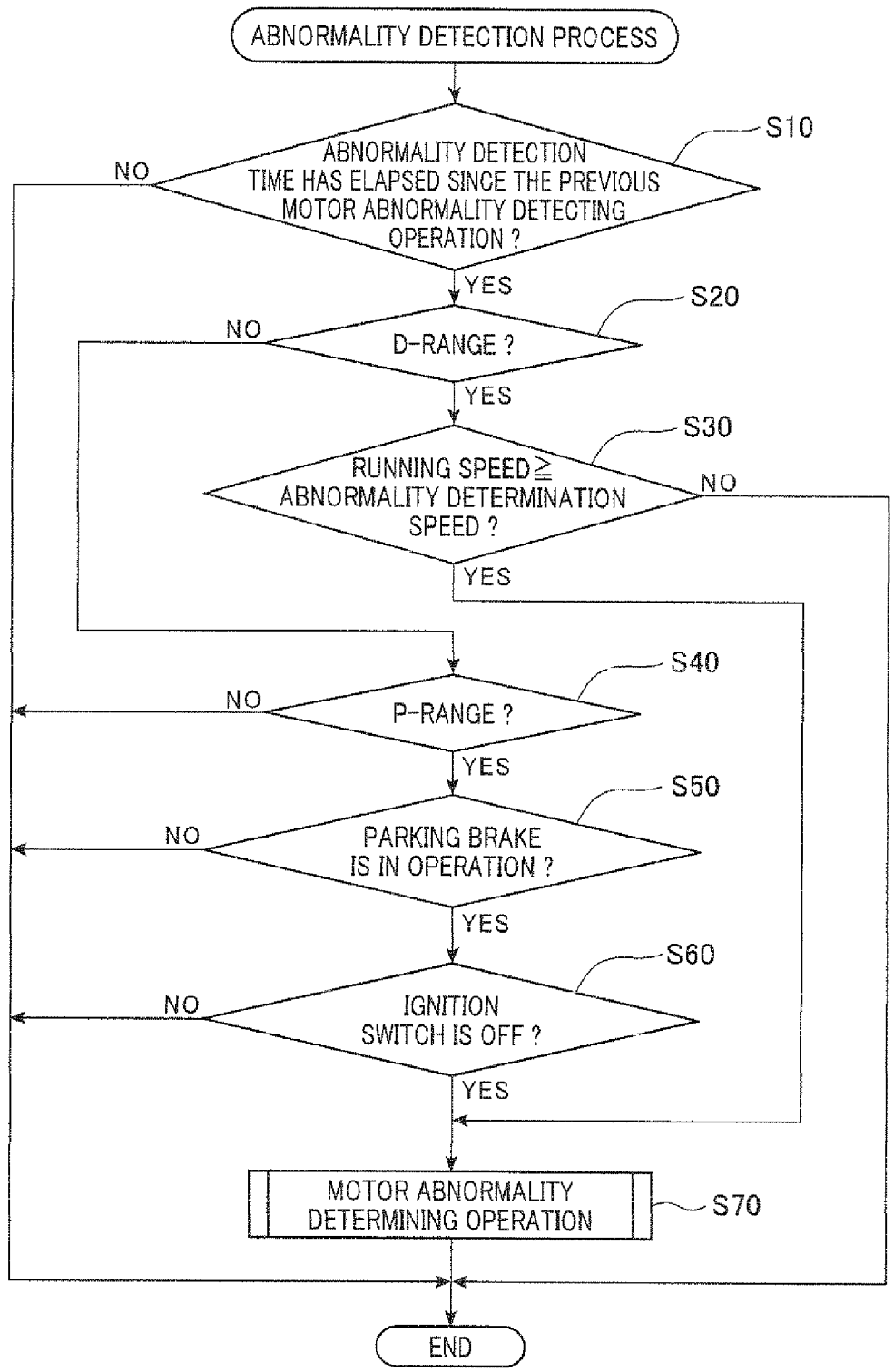
FIG. 3 is a flowchart showing an abnormality detection process performed by the shift range switching apparatus 1.

First, the abnormality detection process is explained with reference to the flowchart of FIG. 3. The abnormality detection process is performed repeatedly while the shift-by-wire ECU 15 is in operation.

The abnormality detection process begins by determining at step S10 whether or not a predetermined abnormality detection time (four hours, in this embodiment) has elapsed from the time when the later explained motor abnormality determining operation was performed at step 70. If the determination result at step S10 is negative, the process is terminated. If the determination result at step S10 is affirmative, the process proceeds to step S20 where it is determined whether or not the shift range of the automatic transmission 3 is at the D-range.

If the determination result at step S20 is negative, the process proceeds to step S40. If the determination result at step S20 is affirmative, the process proceeds to step 30 where it is determined whether or not the vehicle speed is higher than or equal to a predetermined abnormality determination speed (70 km/h, in this embodiment) on the basis of the output signal of the vehicle speed sensor 9. If the determination result at step S30 is negative, the process is terminated. If the determination result at step S30 is affirmative, the process proceeds to step S70.

At step S40, it is determined whether or not the shift range of the automatic transmission 3 is at the P-range on the basis of the output signal of the shift switch 11. If the determination result at step S40 is negative, the process is terminated. If the determination result at step S40 is affirmative, the process proceeds to step S50 where it is determined whether or not the parking brake is in operation on the basis of the output signal of the parking brake switch 8.

If the determination result at step S50 is negative, the process is terminated. If the determination result at step S50 is affirmative, the process proceeds to step S60 where it is determined whether or not the ignition switch 7 is off on the basis of the output signal of the ignition switch 7. If the determination result at step S60 is negative, the process is terminated. If the determination result at step S60 is affirmative, the process proceeds to step S70.

At step S70, the motor abnormality determining operation (explained in detail as follows) is performed, and then the process is terminated. Next, the motor abnormality determining operation performed at step S70 is explained with reference to the flowchart of FIG. 4.

The motor abnormality determining operation begins by determining at step S210 whether or not the shift range of the automatic transmission 3 is at the D-range. If the determination result at step S210 is negative, the operation proceeds to step S290. If the determination result at step S210 is affirmative, the operation proceeds to step S220 where the motor 13 is commanded to rotate by an amount which is sufficiently smaller than an amount of rotation necessary for the automatic transmission 3 to change from the D-range to the adjacent range (that is, the N-range).

Figure 6:
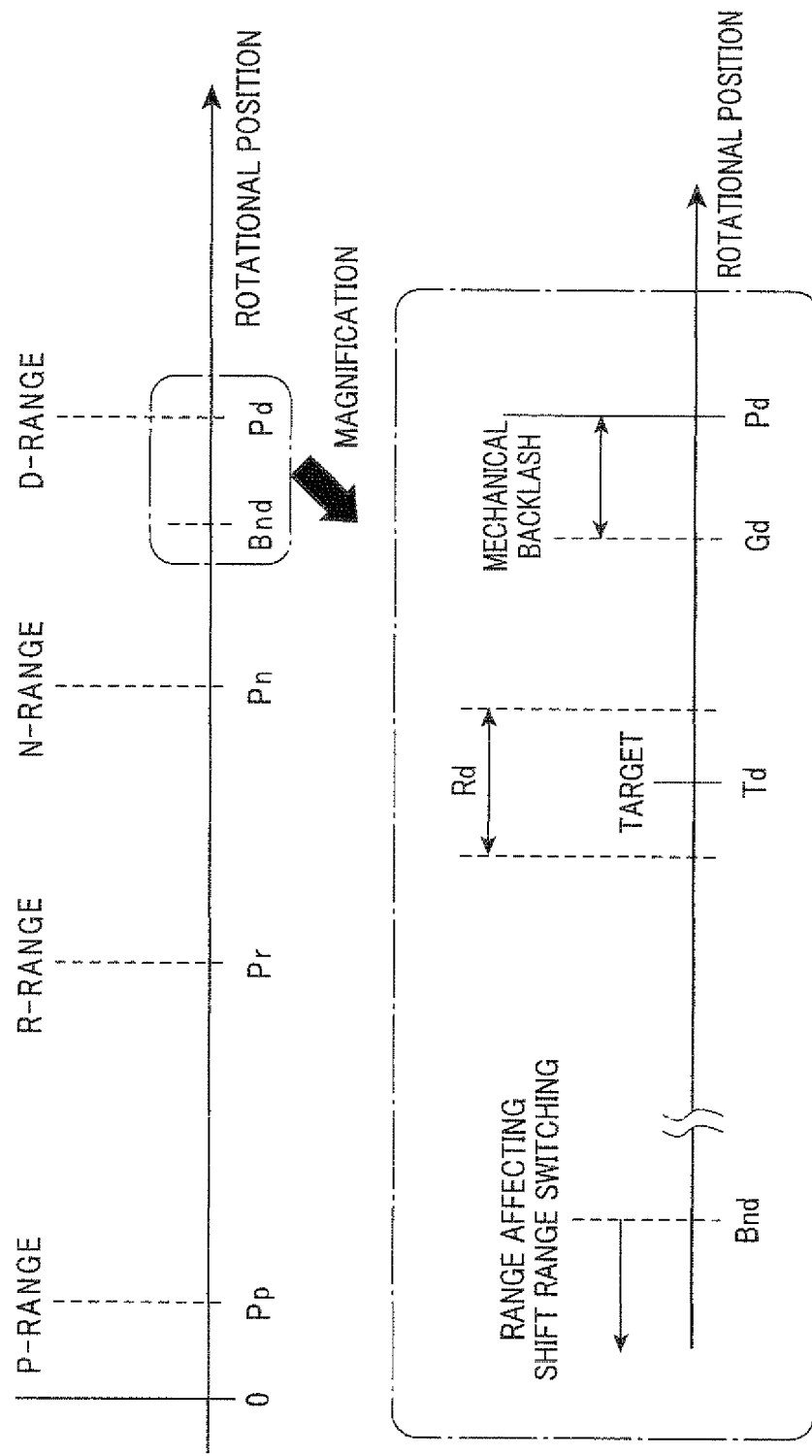
FIG. 6 is a diagram showing the relationship between the shift range of an automatic transmission and the rotational position of a motor 13 included in the shift range switching apparatus 1 in detail in the vicinity of the D-range.

Here, the rotation amount by which the motor 13 is commanded to rotate at step S220 (referred to as "commanded rotation amount" hereinafter) is explained with reference to FIG. 6. FIG. 6 is a diagram showing the relationship between the shift range of the automatic transmission 3 and the rotational position of the motor 13 explained in detail in the vicinity of the D-range.

Here, the rotational position (angular position) of the motor 13 is represented by Pp, Pr, Pn and Pd (Pp<Pr<Pn<Pd) when the shift range of the automatic transmission 3 is at the P-range, R-range, N-range and D-range, respectively. As shown in FIG. 6, between the N-range rotational position Pn and the D-range rotational position Pd, there exists a rotational position Bnd as a boundary between the N-range and the D-range (referred to as "N-D boundary rotational position" hereinafter). Further, between the N-range rotational position Pn and the D-range rotational position Pd, there exists a rotational position Gd at which the variation of the rotational position of the motor 13 is at its maximum (referred to as "D-backlash rotational position" hereinafter), the variation being caused due to mechanical backlash between the stator and the motor shaft of the motor 13 although the motor 13 is stopped.

The target position Td to which the motor 13 should rotate to at step S220 (referred to as "D-range target rotational position" hereinafter) is set between the N-D boundary rotational position Bnd and the D-backlash rotational position Gd. The D-range target rotational position Td is set to a value sufficiently larger than that of the N-D boundary rotational position Bnd. Accordingly, the commanded rotation amount of the motor 13 at step S220 is equal to |Td−Pd|.

Figure 4:
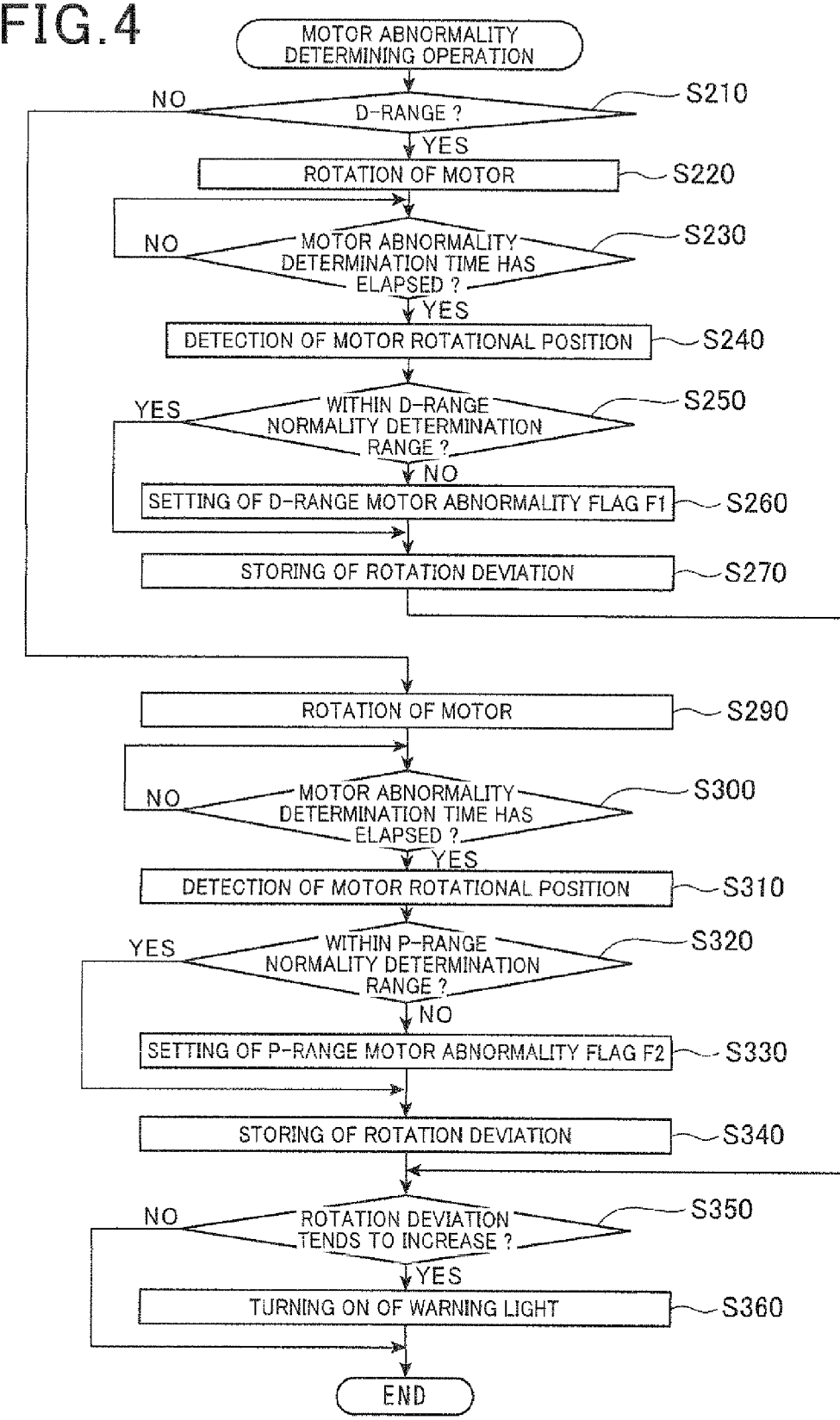
FIG. 4 is a flowchart showing a motor abnormality detecting operation performed by the shift range switching apparatus 1.

Returning to the flowchart of FIG. 4, after completion of step S220, the operation proceeds to step S230 where it is determined whether or not a predetermined motor abnormality determination time (1 second in this embodiment) has elapsed since the start of rotation of the motor 13 at step S220. The operation waits until the determination result at step S230 becomes affirmative. When the determination result at step S230 is affirmative, the operation proceeds to step S240 to detect the rotational position of the motor 13, and thereafter proceeds to step S250 to determine whether or not the rotational position of the motor 13 is within a predetermined D-range normality determination range Rd. The D-range normality determination range Rd is determined to include the D-range target rotational position Td between the N-D boundary rotational position Bnd and the D-backlash rotational position Gd (see FIG. 6).

If the determination result at step S250 is affirmative, the operation proceeds to step S270. If the determination result at step S250 is negative, the operation proceeds to step S260 to set the D-range motor abnormality flag F1, and thereafter proceeds to step S270.

At step S270, a difference between the rotational position of the motor 13 detected at step S240 and the D-range target rotational position Td is calculated, and stores this calculated difference (referred to as "D-range rotation deviation" hereinafter) in the EEPROM 15a. Thereafter, the operation proceeds to step S350.

At step S290, the motor 13 is commanded to rotate by an amount which is sufficiently smaller than an amount of rotation necessary for the automatic transmission 3 to change from the P-range to the adjacent range (that is, the R-range).

Figure 7:
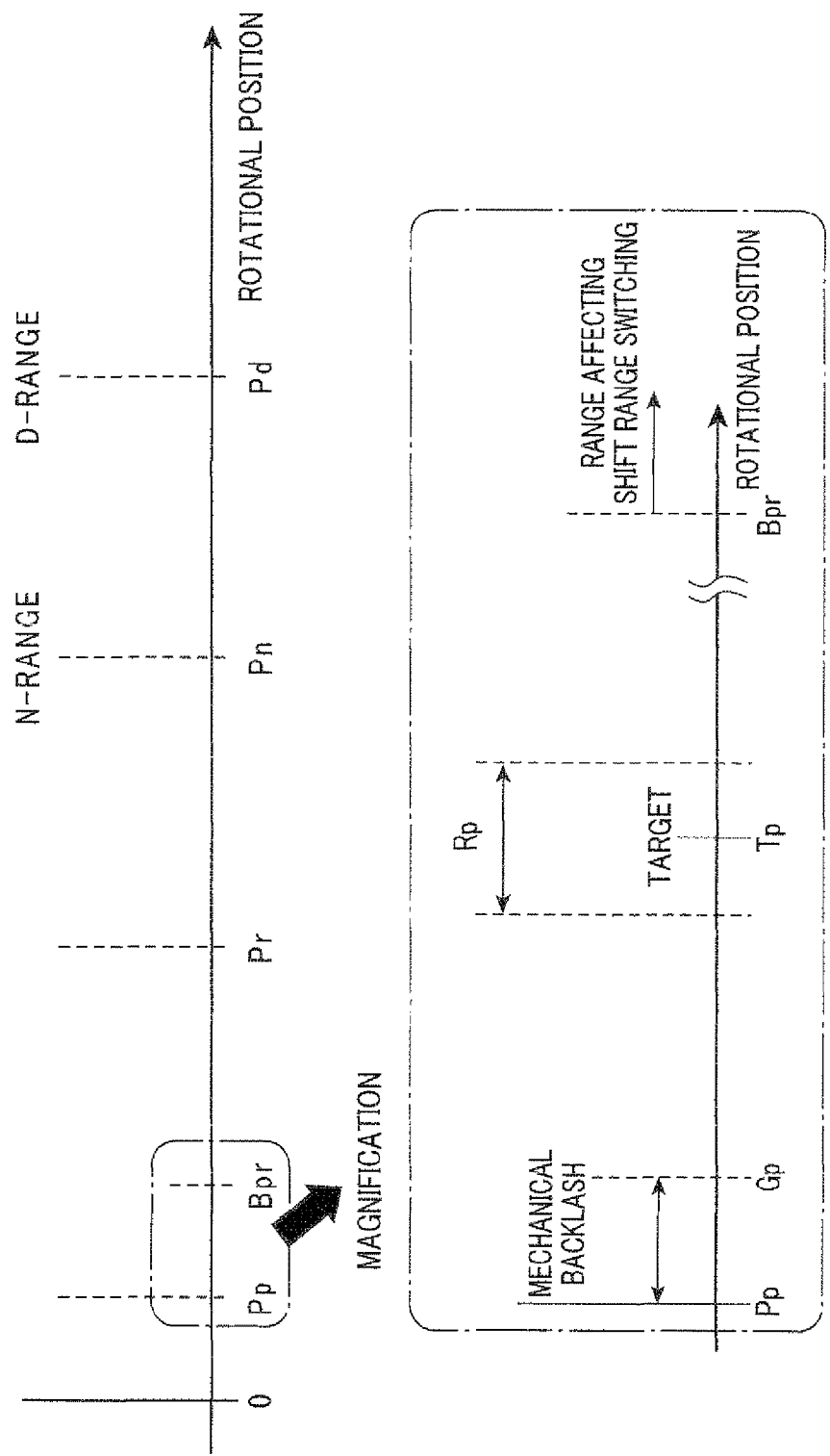
FIG. 7 is a diagram showing the relationship between the shift range of the automatic transmission and the rotational position of the motor 13 in detail in the vicinity of the P-range.

Here, the rotation amount by which the motor 13 is commanded to rotate at step S290 (referred to as "commanded rotation amount" hereinafter) is explained with reference to FIG. 7. FIG. 7 is a diagram showing the relationship between the shift range of the automatic transmission 3 and the rotational position of the motor 13 in detail in the vicinity of the P-range.

As shown in FIG. 7, between the P-range rotational position Pp and the R-range rotational position Pr, there exists a rotational position Bpr as a boundary between the P-range and the R-range (referred to as "P-R boundary rotational position" hereinafter). Further, between the P-range rotational position Pp and the R-range rotational position Pr, there exists a rotational position Gp at which the variation of the rotational position of the motor 13 is at its maximum (referred to as "P-backlash rotational position" hereinafter), the variation being caused due to mechanical backlash between the stator and the motor shaft of the motor 13 although the motor 13 is stopped.

The target position Tp to which the motor 13 should rotate to at step S290 (referred to as "P-range target rotational position" hereinafter) is set between the P-R boundary rotational position Bpr and the P-backlash rotational position Gp. The P-range target rotational position Tp is set to a value sufficiently smaller than that of the P-R boundary rotational position Bpr. Accordingly, the commanded rotation amount of the motor 13 at step S290 is equal to |Tp−Pp|.

Returning to the flowchart of FIG. 4, after completion of step S290, the operation proceeds to step S300 where it is determined whether or not the motor abnormality determination time has elapsed since the start of rotation of the motor 13 at step S290. The operation waits until the determination result at step S300 becomes affirmative. When the determination result at step S300 is affirmative, the operation proceeds to step S310 to detect the rotational position of the motor 13, and thereafter proceeds to step S320 to determine whether or not the rotational position of the motor 13 is within a predetermined P-range normality determination range Rp. The P-range normality determination range Rp is determined to include the P-range target rotational position Tp between the P-R boundary rotational position Bpr and the P-backlash rotational position Gp (see FIG. 6).

If the determination result at step S320 is affirmative, the operation proceeds to step S340. If the determination result at step S320 is negative, the operation proceeds to step S330 to set the P-range motor abnormality flag F2, and thereafter proceeds to step S340.

At step S340, a difference between the rotational position of the motor 13 detected at step S310 and the P-range target rotational position Tp is calculated, and this calculated difference (referred to as "P-range rotation deviation" hereinafter) is stored in the EEPROM 15a. Thereafter, the operation proceeds to step S350.

At step S350, it is determined whether or not at least one of the D-range rotation deviation and the P-range rotation deviation has a tendency to increase on the basis of the D-range rotation deviation and the P-range rotation deviation stored in the EEPROM 15a.

If the determination result at step S350 is negative, this operation is terminated. If the determination result at step S350 is affirmative, the operation proceeds to step S360 to cause the meter ECU 6 to turn on the warning light 10c, and thereafter, the operation is terminated.

Figure 5:
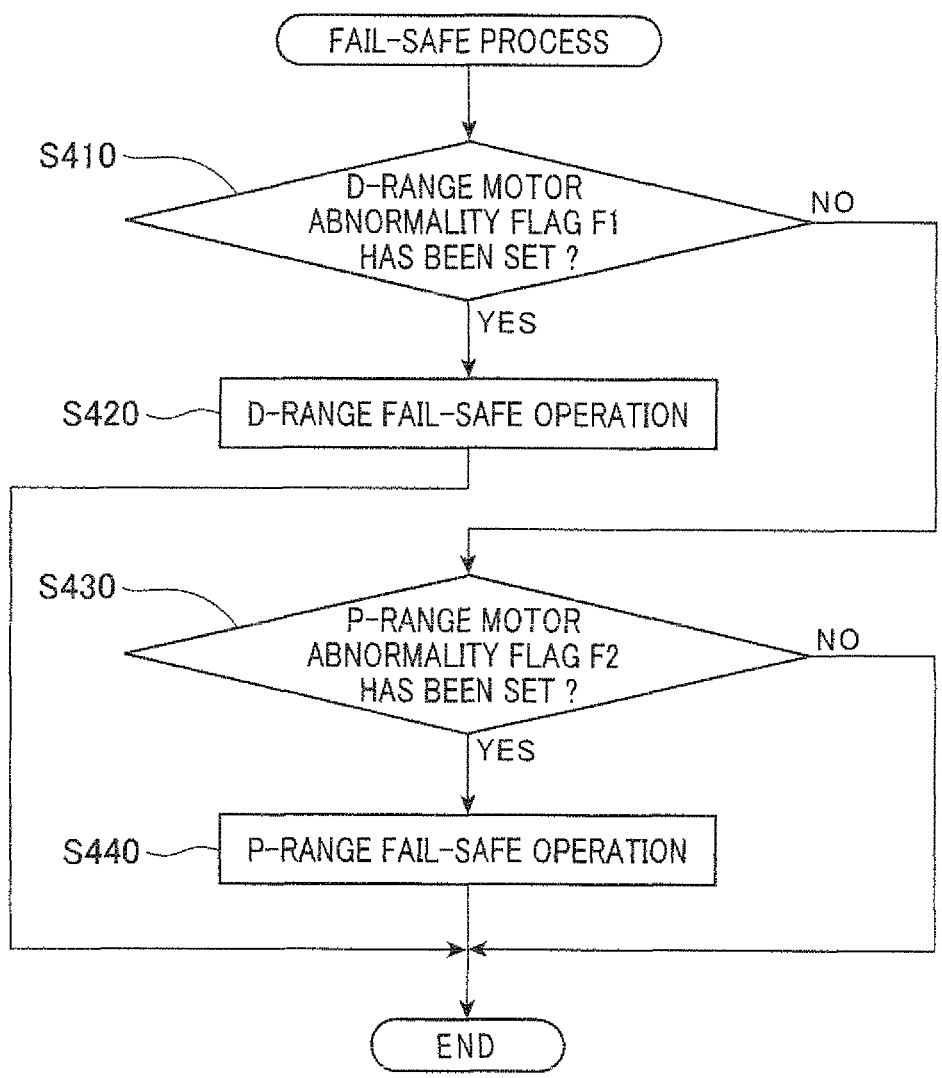
FIG. 5 is a flowchart showing a fail-safe process performed by the shift range switching apparatus 1.

Next, the fail-safe process performed by the shift-by-wire ECU 15 is explained with reference to the flowchart of FIG. 5. The fail-safe process is performed repeatedly while the shift-by-wire ECU 15 is in operation.

At the beginning of the fail-safe process, the shift-by-wire ECU 15 determines at step S 410 whether or not the D-range motor abnormality flag F1 has been set. If the determination result at step S410 is negative, the process proceeds to step S430. If the determination result at step S410 is affirmative, the process proceeds to step S420 to perform a D-range fail-safe operation, and thereafter, the process is terminated.

The D-range fail-safe operation includes first to third operations. The first operation is an operation to inhibit driving the motor 13. By performing the first operation, the shift range of the automatic transmission 3 is held at the D-range irrespective of the vehicle driver's operation of the shift lever 2. The second operation is an operation to cause the meter ECU 6 to turn on the warning light 10a to induce the vehicle driver to stop the vehicle and to operate the parking brake. The third operation is an operation to cause the engine ECU 5 to stop the engine 4 when the vehicle is stopped and the parking brake is applied.

At step S430, it is determined whether or not the D-range motor abnormality flag F2 has been set. If the determination result at step S430 is negative, the process is terminated. If the determination result at step S430 is affirmative, the process proceeds to step S440 to perform a P-range fail-safe operation, and thereafter the process is terminated.

The P-range fail-safe operation includes first and second operations. The first operation is an operation to inhibit driving the motor 13. By performing the first operation, the shift range of the automatic transmission 3 is held at the P-range irrespective of the vehicle driver's operation of the shift lever 2. The second operation is an operation to cause the meter ECU 6 to turn on the warning light 10b to indicate occurrence of abnormality in the shift range switching apparatus 1.

Incidentally, to clear each of the D-range motor abnormality flag F1 and the P-range motor abnormality flag F2, a flag clear command is transmitted to the shift-by-wire ECU 15 from a vehicle-use fault diagnosis device communicatably connected to the shift-by-wire ECU 15. Accordingly, after the motor 13 with abnormality is repaired or replaced, the flags F1 and F2 can be cleared by inputting the flag clear command through the vehicle-use fault diagnosis device.

In the shift range switching apparatus 1 having the above described structure, the motor 13 serves as a power source to drive the shift switching mechanism 12 in order to switch the shift range of the automatic transmission 3, the shift lever 2 is operated by the vehicle driver to select the shift range, and the shift-by-wire ECU 15 controls the motor 13 so that the automatic transmission 3 is in the shift range selected by means of the shift lever 2.

The parking brake is applied if the vehicle speed is higher than the predetermined abnormality determination speed (higher than 70 k/m in this embodiment) (S30: YES) when the shift range is at the D-range (S20: YES), and also applied when the shift range is at the P-range (S40: YES). Thereafter, if the ignition switch is off (S60: YES), the motor 13 is driven to rotate (S220, S290). After the motor 13 is driven to rotate, the rotational position of the motor 13 is detected (step S240, S310), and it is determined whether or not the motor 13 is abnormal in accordance with whether or not the rotational position of the motor 13 is within the D-range normality determination range Rd or within the P-range normality determination range Rp.

Accordingly, the operation to detect whether or not the motor 13 is abnormal can be performed when the vehicle driver is not likely to operate the shift lever 2. Hence, it is possible to detect an occurrence of abnormality in the motor 13 before the vehicle driver operates the shift lever 2.

Incidentally, at step S220 and step 2290, when the roller 33a of the detent spring 33 is engaged in the recess 41 for the P-range or the recess 44 for the D-range of the detent plate 32, the motor 13 is rotated by an amount within which this engagement is maintained.

If the motor 13 is detected to be abnormal (S410: YES) when the shift range is at the D-range, indication is made to induce the vehicle driver to stop the vehicle and operate the parking brake maintaining the shift range at the D-range, and after the vehicle is stopped and the parking brake is applied, an operation to stop the engine is performed (step S420).

The indication to induce the vehicle driver to stop the vehicle and operate the parking brake enables the vehicle driver and passengers to be aware of occurrence of abnormality in the motor 13 before the vehicle driver operates the shift lever 2. Since the engine of the vehicle is stopped after the parking brake is applied, it is possible to prevent the vehicle from starting to run contrary to the vehicle driver's intention after the vehicle is stopped and the parking brake is applied.

If the motor 13 is detected to be abnormal (S430: YES) when the shift range is at the P-range, indication is made to notify an occurrence of abnormality in the shift range switching apparatus 1 when the engine is started, maintaining the shift range at the P-range.

This enables the vehicle driver and passengers to notice that the shift switching apparatus 1 is out of order before the vehicle driver operates the shift lever 2 to start the vehicle.

The motor abnormality determining operation is performed (step S10) at each elapse of the predetermined abnormality determination time, and accordingly, the load of the motor 13 can be reduced because it is not necessary to continuously drive the motor 13 to detect abnormality in the motor 13.

Abnormality determination of the motor 13 (S250, S320) is made after an elapse of the motor abnormality determination time (S230, S300) since the start of the motor 13 (S220, S290). Accordingly, since abnormality determination of the motor 13 is not made continuously but only periodically until the motor abnormality determination time elapses after start of rotation of the motor 13, the load necessary to detect abnormality of the motor 13 can be made small.

Each of the D-range target rotational position Td and the P-range target rotational position Tp is set such that the rotation amount of the motor 13 is larger than the mechanical backlash between the stator and the motor shaft of the motor 13, and the shift range is not switched unintentionally (S220, S290). This makes it possible to prevent erroneous determination that that the motor 13 having abnormality is normal when the motor 13 rotates due to the mechanical backlash. Further, it is possible to prevent the shift range from being switched unintentionally when the motor 13 is driven to rotate to detect presence or absence of abnormality in the motor 13.

When there is tendency that at least one of the D-range rotation deviation and the P-range rotation deviation increases (S350: YES), the warning light 10c is turned on to indicate to that effect (S360). This makes it possible to notify the vehicle driver and passengers that the motor 13 is not abnormal but is showing early signs of some abnormality.

Second Embodiment

Figure 8:
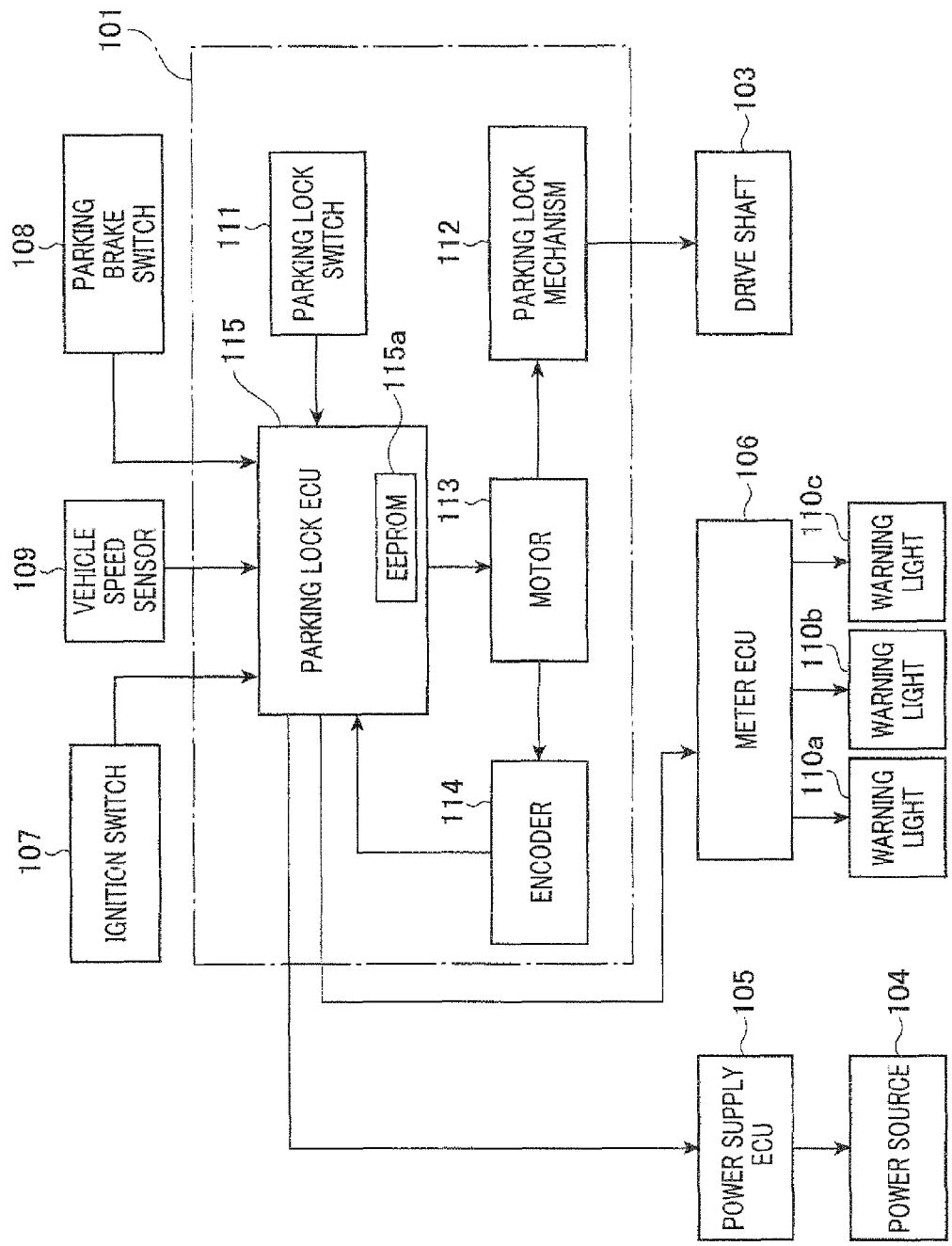
FIG. 8 is a block diagram showing the electrical structure of a parking lock apparatus 101 as a second embodiment of the invention.
Figure 9:
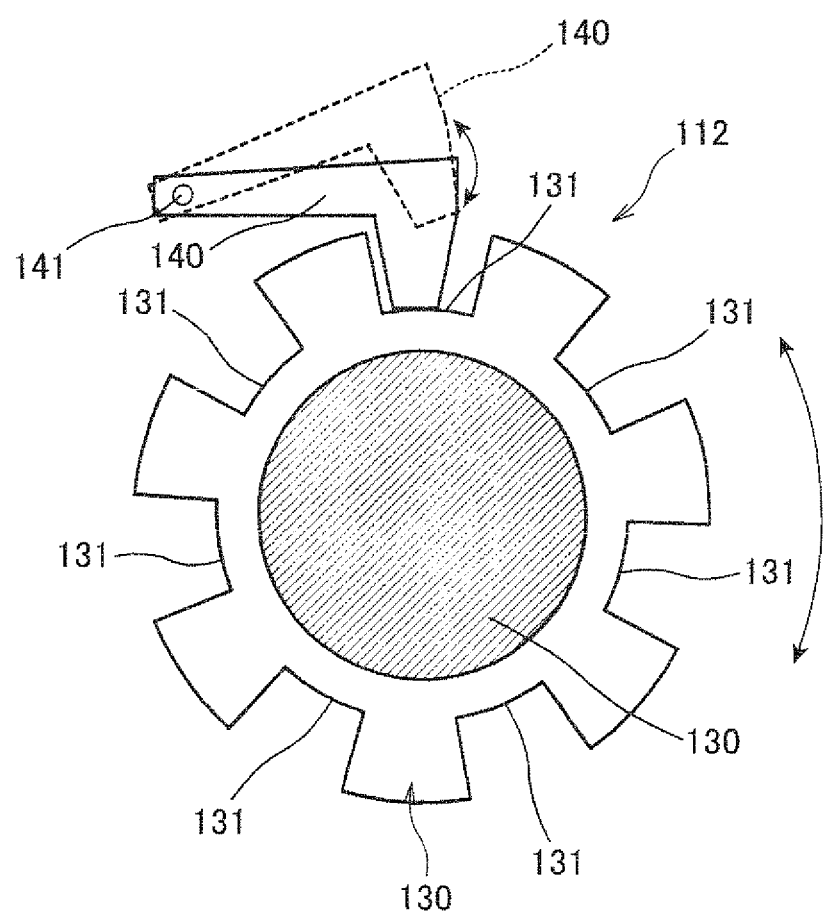
FIG. 9 is a front view showing the structure of a parking lock switching mechanism 112 included in the parking lock apparatus 101.

FIG. 8 shows the electrical structure of a parking lock apparatus 101 as a second embodiment of the invention. FIG. 9 is a front view of the parking lock switching mechanism 112 included in the parking lock apparatus 101. The parking lock apparatus 101, which is mounted on an electric vehicle not having an automatic transmission, includes the parking lock switching mechanism 112, a parking lock switch 111, a motor 113, an encoder 114, and a parking lock ECU 115.

The parking lock switching mechanism 112 performs switching between a parking lock state in which a drive shaft 103 is inhibited from rotating, the drive shaft 103 being coupled to a drive power source 104 of the vehicle to transmit the drive power of the drive power source 104 to the wheels of the vehicle, and a non-parking lock state in which the drive shaft 103 is allowed to rotate. The parking lock switch 111 is operated by the vehicle driver to select between the parking lock state and the non-parking lock state. The motor 113 drives the parking lock switching mechanism 112. The encoder 114 detects the rotational position of the motor 113. The parking lock ECU controls the rotation of the motor 113.

The parking lock ECU 115 is communicatably connected with a drive power source ECU 105 which controls the operation of the drive power source 104 of the vehicle, and a meter ECU 106 which controls a display section (not shown) mounted on an instrumental panel (not shown) to indicate various states of the vehicle. The parking lock ECU 115 is inputted with the output signal of an ignition switch 107 of the vehicle, the output signal of a parking brake switch 108 to detect the operation state of a parking brake (not shown) of the vehicle, and the output signal of a vehicle speed sensor 109.

The parking lock ECU 115 includes an EEPROM 115a capable of holding data written therein even when not supplied with electric power. The EEPROM 115a stores flags F11 and F12. The flag F11 is set to indicate that there is abnormality in the motor 113 during the non-parking lock state. The flag F12 is set to indicate that there is abnormality in the motor 13 during the parking lock state. Hereinafter, the flag F11 may be referred to as "non-parking lock state motor abnormality flag F11", and the flag F12 may be referred to as "parking lock state motor abnormality flag F12".

The meter ECU 106 includes warning lights 110a, 110b and 110c installed in the instrument panel. The warning light 110a is turned on to induce the vehicle driver to stop the vehicle and operate the parking brake. The warning light 110b is turned on to indicate occurrence of abnormality in the parking lock apparatus 101. The warning light 110c is turned on to indicate that the parking lock apparatus 101 has a tendency to be abnormal.

As shown in FIG. 9, the parking lock switching mechanism 112 includes a parking lock gear 130 which rotates around and together with the drive shaft 103, and a parking lock pin 140 engageable with the parking lock gear 130.

The parking lock gear 130 is a plate-like member having a circular surface formed with a plurality of recesses 131 along the outer periphery thereof. The parking lock gear 130 is fixed to the drive shaft 103 at the center portion of the circular surface thereof such that the circular surface is substantially orthogonal to the axis of the drive shaft 103. The parking lock pin 140 is disposed in the vicinity of the outer periphery of the parking lock gear 130 and fixed to a rotation shaft 141 coupled to the drive shaft of the motor 113 at one end thereof. The other end of the parking lock pin 140 is shaped to be engageable with the recess 131.

The parking lock switching mechanism 112 having the above described structure is possible to switch between the parking lock state in which the parking lock gear 130 and the parking lock pin 140 are engaged with each other (see the parking lock pin 140 shown by the solid line in FIG. 9) and the non-parking lock state in which the engagement between the parking lock gear 130 and the parking lock pin 140 is released (see the parking lock pin 140 shown by the broken line in FIG. 9) by rotating the parking lock pin 140 around the rotation shaft 141 by means of the motor 113.

In the parking lock apparatus 101 having the above structure, the parking lock ECU 115 performs an abnormality detection process to detect abnormality in the motor 113 and a fail-safe process to reduce the effect of abnormality occurred in the motor 13 to a minimum.

Figure 10:
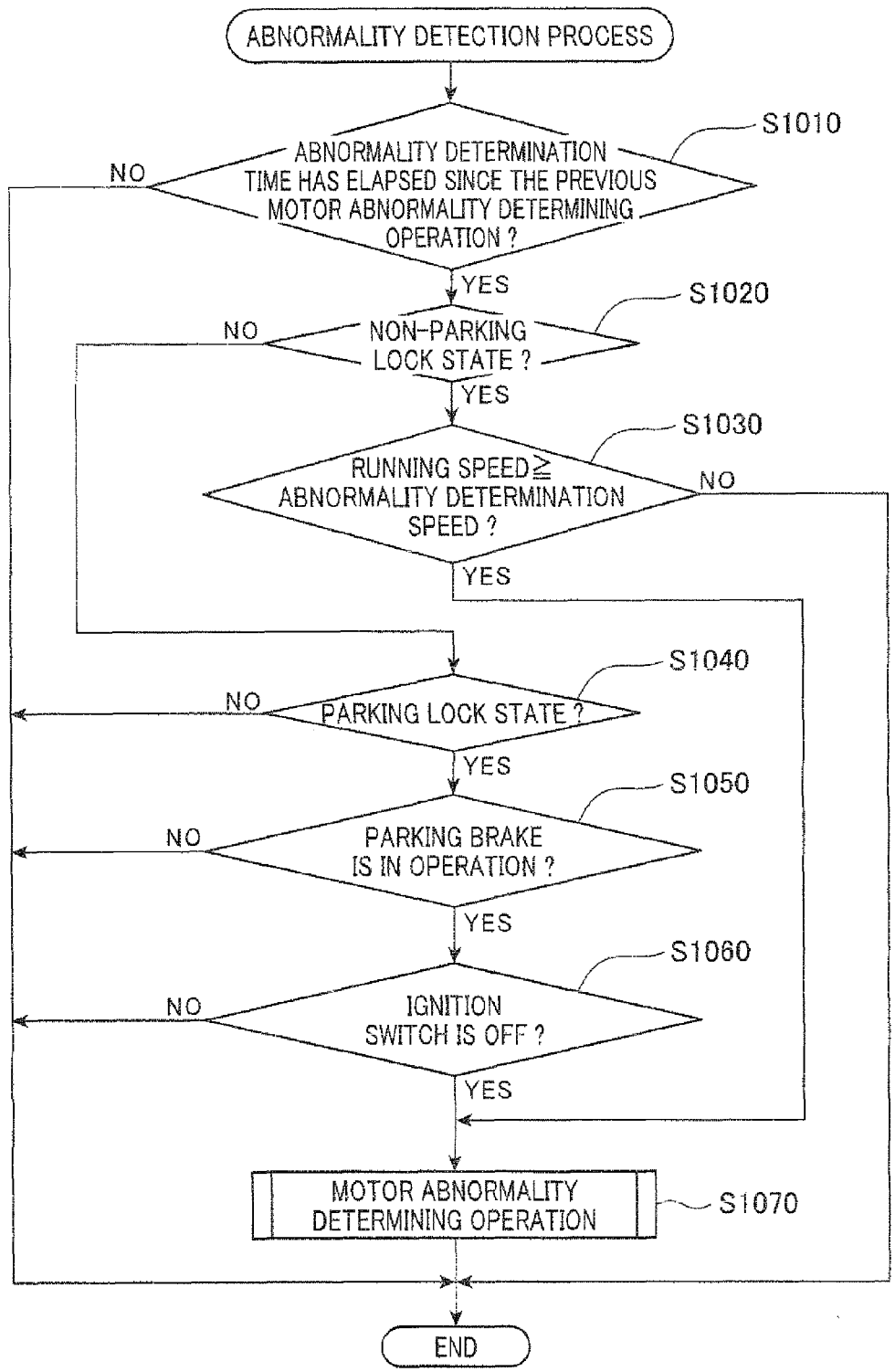
FIG. 10 is a flowchart showing an abnormality detection process performed by the parking lock apparatus 101.

First, the abnormality detection process is explained with reference to the flowchart of FIG. 10. The abnormality detection process is performed repeatedly while the parking lock ECU 115 is in operation.

The abnormality detection process begins by determining at step S1010 whether or not a predetermined abnormality detection time (four hours, in this embodiment) has elapsed since the start of a later explained motor abnormality determining operation performed at step S1070. If the determination result at step S1010 is negative, the process is terminated. If the determination result at step S1010 is affirmative, the process proceeds to step S1020 where it is determined whether or not the non-parking lock state is in effect in accordance with the output signal of the parking lock switch 111.

If the determination result at step S1020 is negative, the process proceeds to step S1040. 20 is affirmative, the process proceeds to step S1030 where it is determined whether or not the vehicle speed is higher than or equal to a predetermined abnormality determination speed (70 km/h, in this embodiment) in accordance with the output signal of the vehicle speed sensor 9. If the determination result at step S1030 is negative, the process is terminated. If the determination result at step S1030 is affirmative, the process proceeds to step S1070.

At step S1040, it is determined whether or not the parking lock state is in effect in accordance with the output signal of the parking lock switch 111. If the determination result at step S1040 is negative, the process is terminated. If the determination result at step S1040 is affirmative, the process proceeds to step S1050 where it is determined whether or not the parking brake is in operation in accordance with the output signal of the parking brake switch 108.

If the determination result at step S1050 is negative, the process is terminated. If the determination result at step S1050 is affirmative, the process proceeds to step S1060 where it is determined whether or not the ignition switch 107 is off in accordance with the output signal of the ignition switch 107. If the determination result at step S1060 is negative, the process is terminated. If the determination result at step S1060 is affirmative, the process proceeds to step S1070.

At step S1070, the motor abnormality determining operation (explained in detail as follows) is performed, and thereafter, the process is terminated. Next, the motor abnormality determining operation performed at step S1070 is explained with reference to the flowchart of FIG. 11.

The motor abnormality determining operation begins by determining at step S1210 whether or not the non-parking lock state is in effect. If the determination result at step S210 is negative, the operation proceeds to step S1290. If the determination result at step S1210 is affirmative, the operation proceeds to step S1220 where the motor 13 is commanded to rotate by an amount which is sufficiently smaller than an amount of rotation necessary to switch from the non-parking lock state to the parking lock state.

Figure 13:
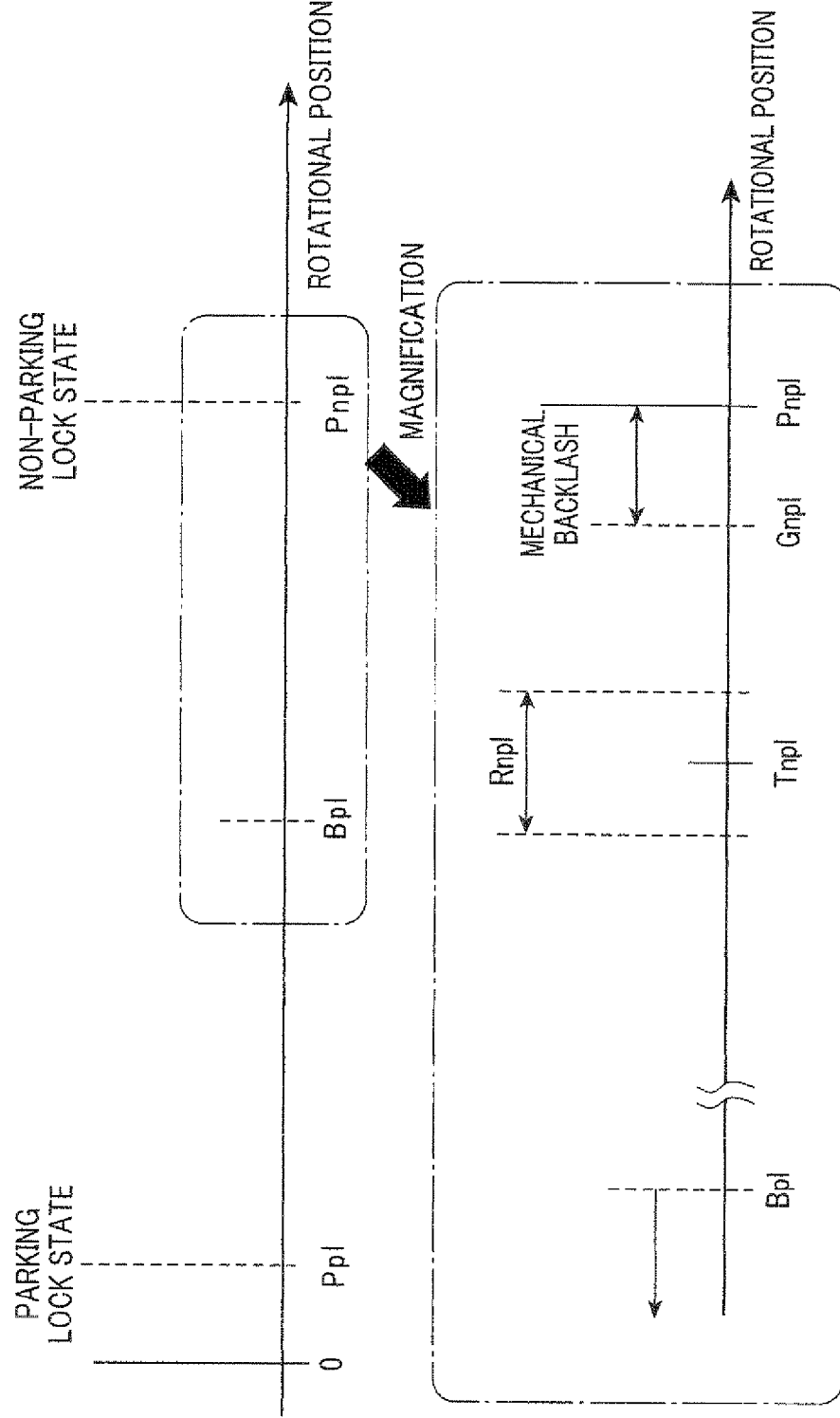
FIG. 13 is a diagram showing the relationship between each of a parking lock state and a non-parking lock state and the rotational position of a motor 113 included in the parking lock apparatus 101 in detail in the vicinity of the non-parking lock state.

Here, the rotation amount by which the motor 13 is commanded to rotate at step S1220 (referred to as "commanded rotation amount" hereinafter) is explained with reference to FIG. 13. FIG. 13 is a diagram showing the relationship between each of the parking lock state and the non-parking lock state and the rotational position of the motor 13 in detail in the vicinity of the non-parking lock state.

Here, the rotational position (angular position) of the motor 113 is represented by Ppl and Pnpl (Ppl<Pnpl) when the parking lock state is in effect and when the non-parking lock state is in effect, respectively. As shown in FIG. 13, between the parking lock state rotational position Ppl and the non-parking lock state rotational position Pnpl, there exists a rotational position Bpl as a boundary between the parking lock state and the non-parking lock state (referred to as "parking lock boundary rotational position" hereinafter). Further, between the non-parking lock state rotational position Pnpl and the parking lock boundary rotational position Bpl, there exists a rotational position Gnpl at which the variation of the rotational position of the motor 113 is at its maximum (referred to as "non-parking lock state backlash rotational position" hereinafter), the variation being caused due to mechanical backlash between the stator and the motor shaft of the motor 13 although the motor 113 is stopped.

The target position Tnpl to which the motor 113 should rotate at step S1220 (referred to as "non-parking lock state target rotational position" hereinafter) is set between the parking lock boundary rotational position Bpl and the non-parking lock state backlash rotational position Gnpl. The non-parking lock state target rotational position Tnpl is set to a value sufficiently larger than that of the parking lock boundary rotational position Bpl. Accordingly, the commanded rotation amount of the motor 113 at step S1220 is equal to |Tripl−Pnpl|.

Figure 11:
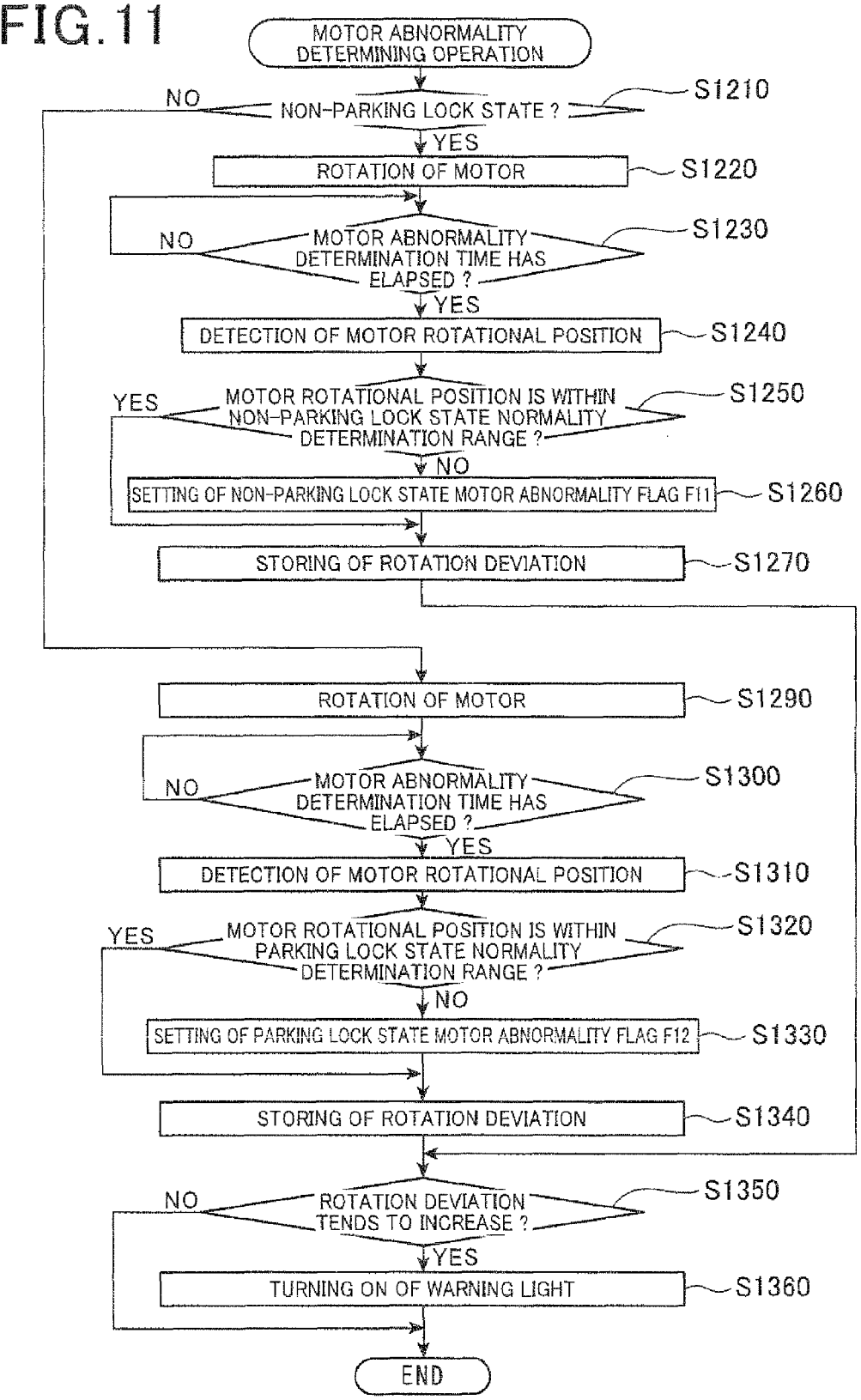
FIG. 11 is a flowchart showing a motor abnormality detecting operation performed by the parking lock apparatus 101.

Returning to the flowchart of FIG. 11, after completion of step S1220, the operation proceeds to step S1230 where it is determined whether or not a predetermined motor abnormality determination time (1 second in this embodiment) has elapsed since the start of rotation of the motor 113 at step S1220. The operation waits until the determination result at step S1230 becomes affirmative. When the determination result at step S1230 is affirmative, the operation proceeds to step S1240 to detect the rotational position of the motor 113, and thereafter proceeds to step S1250 to determine whether or not the rotational position of the motor 113 is within a predetermined non-parking lock state normality determination range Rnpl. The non-parking lock state normality determination range Rnpl is determined to include the non-parking lock state target rotational position Tnpl between the parking lock boundary rotational position Bpl and the non-parking lock state backlash rotational position Gnpl (see FIG. 13).

If the determination result at step S1250 is affirmative, the operation proceeds to step S1270. If the determination result at step S1250 is negative, the operation proceeds to step S1260 to set the non-parking lock state motor abnormality flag F11, and thereafter proceeds to step S1270.

At step S1270, a difference between the rotational position of the motor 113 detected at step S1240 and the non-parking lock state target rotational position Tnpl is calculated, and this calculated difference (referred to as "non-parking lock state rotation deviation" hereinafter) is stored in the EEPROM 115a. Thereafter, the operation proceeds to step S1350.

At step S1290, the motor 113 is commanded to rotate by an amount which is sufficiently smaller than an amount of rotation necessary for the parking lock state to shift to the non-parking lock state.

Figure 14:
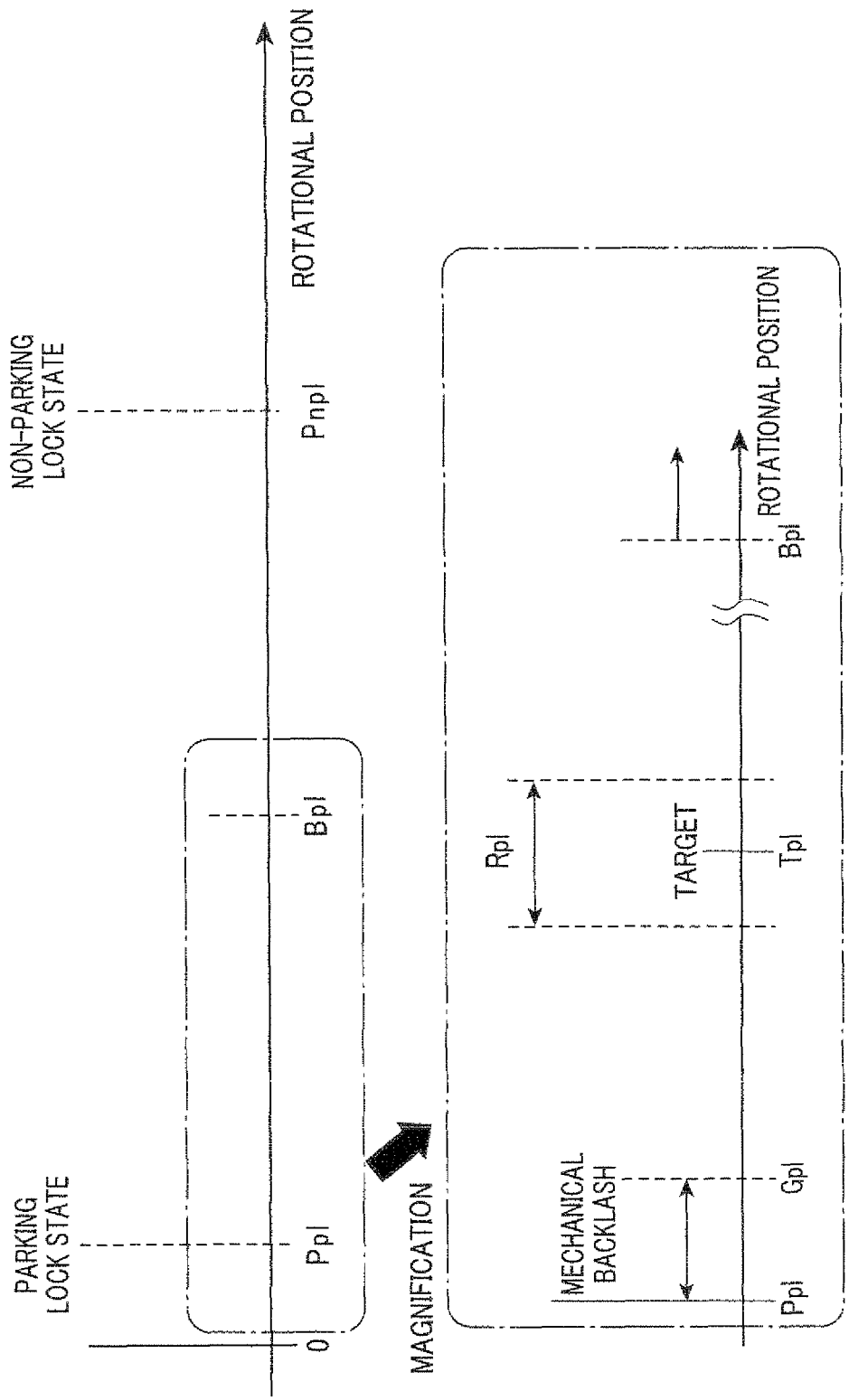
FIG. 14 is a diagram showing the relationship between each of the parking lock state and the non-parking lock state and the rotational position of the motor 113 in detail in the vicinity of the parking lock state.

Here, the rotation amount by which the motor 13 is commanded to rotate at step S1290 (referred to as "commanded rotation amount" hereinafter) with reference to FIG. 14. FIG. 14 is a diagram showing the relationship between each of the parking lock state and the non-parking lock state and the rotational position of the motor 113 in detail in the vicinity of the parking lock state.

As shown in FIG. 14, between the parking lock state rotational position Ppl and the parking lock boundary rotational position Bpl, there exists a rotational position Gpl at which the variation of the rotational position of the motor 113 is at its maximum (referred to as "parking lock state backlash rotational position" hereinafter), the variation being caused due to mechanical backlash between the stator and the motor shaft of the motor 113 although the motor 13 is stopped.

The target position Tpl to which the motor 113 should rotate at step S1290 (referred to as "parking lock state target rotational position" hereinafter) is set between the parking lock boundary rotational position Bpl and the parking lock state backlash rotational position Gpl. The parking lock state target rotational position Tpl is set to a value sufficiently smaller than that of the parking lock boundary rotational position Bpl. Accordingly, the commanded rotation amount of the motor 113 at step S1290 is equal to |Tpl−Ppl|.

Returning to the flowchart of FIG. 11, after completion of step S1290, the operation proceeds to step S1300 where it is determined whether or not the predetermined motor abnormality determination time has elapsed since the start of rotation of the motor 113 at step S1290. The operation waits until the determination result at step S1300 becomes affirmative. When the determination result at step S1300 is affirmative, the operation proceeds to step S1310 to detect the rotational position of the motor 113, and thereafter proceeds to step S1320 to determine whether or not the rotational position of the motor 113 is within a predetermined parking lock state normality determination range Rpl. The parking lock state normality determination range Rpl is determined to include the parking lock state target rotational position Tpl between the parking lock state backlash rotational position Gpl and the parking lock boundary rotational position Bpl (see FIG. 14).

If the determination result at step S1320 is affirmative, the operation proceeds to step S1340. If the determination result at step S1320 is negative, the operation proceeds to step S1330 to set the parking lock state motor abnormality flag F12, and thereafter proceeds to step S1340.

At step S1340, a difference between the rotational position of the motor 113 detected at step S1310 and the parking lock state target rotational position Tpl is calculated, and this calculated difference (referred to as "parking lock state rotation deviation" hereinafter) is stored in the EEPROM 115a. Thereafter, the operation proceeds to step S1350.

At step S1350, it is determined whether or not at least one of the parking lock state rotation deviation and the non-parking lock state rotation deviation has a tendency to increase on the basis of the parking lock state rotation deviation and the non-parking lock state rotation deviation stored in the EEPROM 115a.

If the determination result at step S1350 is negative, this operation is terminated. If the determination result at step S1350 is affirmative, the operation proceeds to step S1360 to cause the meter ECU 106 to turn on the warning light 110c, and thereafter, the operation is terminated.

Figure 12:
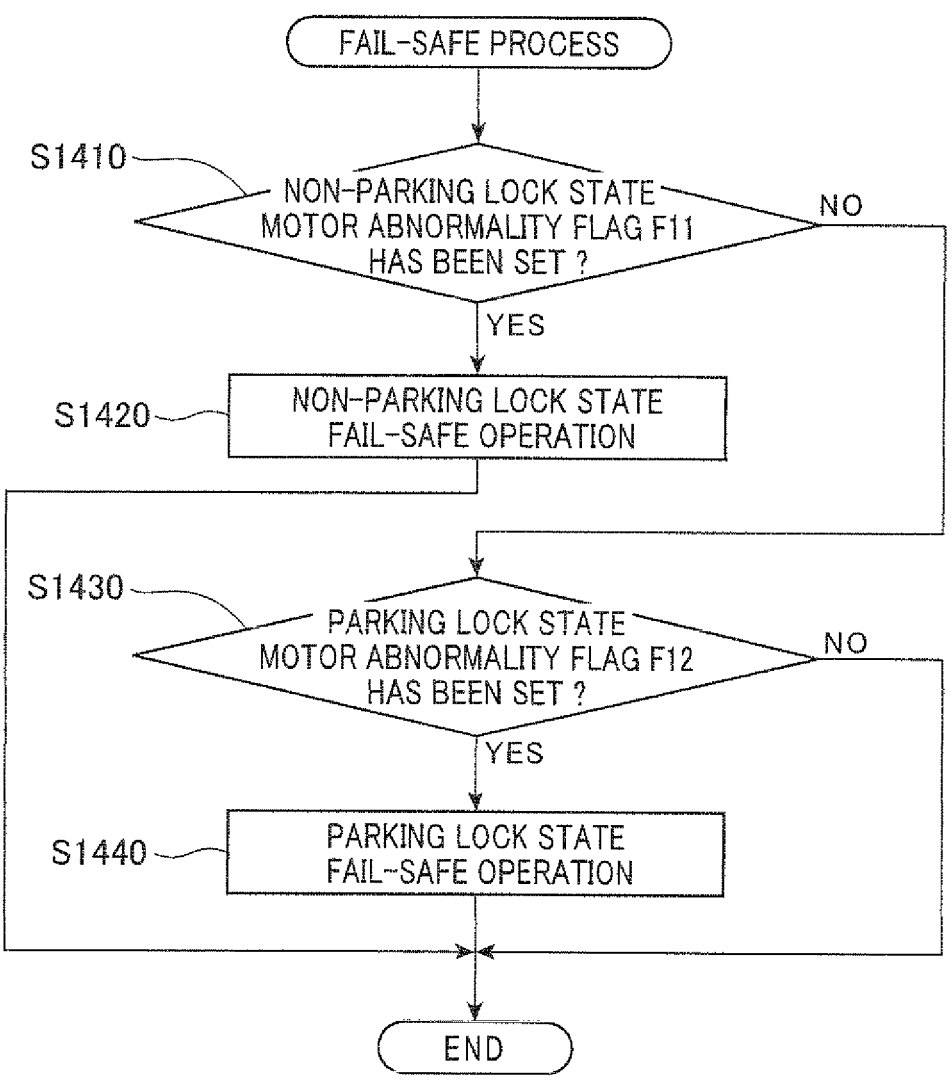
FIG. 12 is a flowchart showing a fail-safe process performed by the parking lock apparatus 101.

Next, the fail-safe process performed by the parking lock ECU 115 is explained with reference to the flowchart of FIG. 12. The fail-safe process is performed repeatedly while the parking lock ECU 115 is in operation.

At the beginning of the fail-safe process, the parking lock ECU 115 determines at step S1410 whether or not the non-parking lock state motor abnormality flag F11 has been set. If the determination result at step S1410 is negative, the process proceeds to step S1430. If the determination result at step S1410 is negative, the process proceeds to step S1420 to perform a non-parking lock state fail-safe operation, and thereafter the process is terminated.

The non-parking lock state fail-safe operation includes first to third operations. The first operation is an operation to inhibit driving the motor 113. By performing the first operation, the non-parking lock state is held irrespective of the vehicle driver's operation of the parking lock switch 111. The second operation is an operation to cause the meter ECU 106 to turn on the warning light 110a to induce the vehicle driver to stop the vehicle and to operate the parking brake. The third operation is an operation to cause the drive power source ECU 105 to stop the drive power source 104 when the vehicle is stopped and the parking brake is applied.

At step S1430, it is determined whether or not the parking lock state motor abnormality flag F12 has been set. If the determination result at step S1430 is negative, the process is terminated. If the determination result at step S1430 is affirmative, the process proceeds to step S1440 to perform a parking lock state fail-safe operation, and thereafter the process is terminated.

The parking lock state fail-safe operation includes first and second operations. The first operation is an operation to inhibit driving the motor 113. By performing the first operation, the parking lock state is held irrespective of the vehicle driver's operation of the parking lock switch 111. The second operation is an operation to cause the meter ECU 106 to turn on the warning light 110b to indicate of occurrence of abnormality in the parking lock apparatus 101.

Incidentally, to clear each of the non-parking lock state motor abnormality flag F11 and the parking lock state motor abnormality flag F12, a flag clear command is transmitted to the parking lock ECU 115 from a vehicle-use fault diagnosis device communicatably connected to the parking lock ECU 115. Accordingly, after the motor 113 with abnormality is repaired or replaced, the flags F11 and F12 can be cleared by inputting the flag clear command through the vehicle-use fault diagnosis device.

In the parking lock apparatus 101 having the above described structure, the motor 113 serves as a power source to drive the parking lock switching mechanism 112, the parking lock switch 111 is operated by the vehicle driver to select between the parking lock state and the non-parking lock state, and the parking lock ECU 115 controls the motor 113 so that one of the parking lock state and the non-parking lock state is in effect in accordance with the vehicle driver's operation of the parking lock switch 111.

The parking brake is applied if the vehicle speed is higher than the predetermined abnormality determination speed (higher than 70 k/m in this embodiment) (S1030: YES) when the non-parking lock state is in effect (S1020: YES), and also applied when the parking lock state is in effect (S1040: YES). Thereafter, if the ignition switch is off (S1060: YES), the motor 113 is driven to rotate (S1220, S1290). After the motor 113 is driven to rotate, the rotational position of the motor 113 is detected (step S1240, S1310), and it is determined where or not the motor 113 is abnormal in accordance with whether or not the rotational position of the motor 113 is within the non-parking lock state normality determination range Rnpl or within the parking lock state normality determination range Rpl (S1250, S1320).

Accordingly, the operation to detect whether or not the motor 113 is abnormal can be performed when the vehicle driver is not likely to operate the parking lock switch 111. Hence, it is possible to detect an occurrence of abnormality in the motor 113 before the vehicle driver operates the parking lock switch 111.

Incidentally, at step S1220 and step S1290, when the parking lock pin 140 is engaged in the recess 131 of the lock gear 130, the motor 113 is rotated by an amount within which this engagement is maintained.

It is a matter of course that various modifications can be made to the above embodiments as described below.

In the first embodiment, the motor abnormality determining operation is performed at step S70 if the vehicle speed is higher or equal to the abnormality determination speed when the shift range is other than the D-range. However, the motor abnormality determining operation may be performed in other states, if the vehicle driver is not likely to perform any operation. For example, the motor abnormality determining operation may be performed when the load of the vehicle engine or the opening degree of the throttle valve is higher than a predetermined threshold, or when the vehicle is running on an expressway. Further, the condition to perform the motor abnormality determining operation may be a combination of two or more of the vehicle speed, engine load, opening degree of the throttle valve and whether the vehicle is running on an expressway.

In the motor abnormality determining operation, the steps for determining whether the shift range is at the D-range (S210 to S270) are performed prior to the steps for determining whether the shift range is at the P-range (S290 to S340). However, this order may be reversed.

The first embodiment may be so configured that when the engine ECU 5 stops the engine 4 by performing the D-range fail-safe process, the engine is allowed to restart only when a seating sensor detects that the vehicle driver is seated on the driver's seat. According to this configuration, although the engine 4 is restarted when the shift rang is at the D-range, it is possible to drive the vehicle safely because the vehicle driver is seated on the driver's seat.

In the first embodiment, the power source to drive the shift switching mechanism 12 is an electric motor. However, the power source is not limited to an electric motor, and any other type of source can be used if it can drive the shift switching mechanism 12 properly.

The second embodiment shows a case in which the parking lock apparatus 101 is mounted on an electric vehicle not having an automatic transmission. However, the present invention can be also applied to a case in which the parking lock apparatus 101 is mounted on a hybrid vehicle not having an automatic transmission. Further, the present invention can be applied to a case in which the parking lock apparatus 101 is mounted on a vehicle which is driven by in-wheel motors.

The above explained preferred embodiments are exemplary of the invention of the present application which is described solely by the claims appended below. It should be understood that modifications of the preferred embodiments may be made as would occur to one of skill in the art.

What is claimed is:

1. A shift range switching apparatus comprising:
   a switching mechanism driven to switch a shift range of an automatic transmission of a vehicle;
   a drive section which operates as a drive source to drive the switching mechanism;
   an operating member operated to switch the shift range;
   a control section to control the drive section such that the shift range is switched in accordance with a switching operation performed by a vehicle driver by means of the operating member;
   an abnormality detection section configured to perform an abnormality detecting operation to cause the drive section to drive the switching mechanism when a predetermined abnormality detection condition is satisfied indicating that the vehicle driver is unlikely to operate the operating member;
   a driving state detection section to detect a driving state of the drive section after the abnormality detection section causes the drive section to drive the switching mechanism; and
   an abnormality determination section to determine whether or not the drive section is abnormal in accordance with a detection result by the driving state detection section; wherein
   the drive section is an electric motor, and the abnormality detection section is configured to cause the electric motor to rotate by a predetermined target rotation amount, the drive state detection section being configured to detect a difference between the target rotation amount and an actual rotation amount of the electric motor as a motor rotation deviation,
   the shift range switching apparatus further comprising an abnormality indication section which, upon detection that the motor rotation deviation has a tendency to increase on the basis of detection results by the driving state detection section, makes an indication to that effect.

2. The shift range switching apparatus according to claim 1, wherein, when the shift range is at a parking range, the abnormality detection condition is set such that a parking brake of the vehicle is in operation, and an ignition switch of the vehicle is off.

3. The shift range switching apparatus according to claim 1, further comprising an abnormality handling section configured to perform an abnormality handling operation to hold the shift range of the automatic transmission at a parking range, and to indicate an occurrence of abnormality in the shift range switching apparatus when the abnormality determination section determines that the drive section is abnormal.

4. The shift range switching apparatus according to claim 3, wherein, when the shift range is at a drive range, the shift range abnormality detection condition is set on the basis of at least one of a speed of the vehicle, an engine load of the vehicle, an opening degree of a throttle valve of the vehicle, and whether or not the vehicle is running on an expressway.

5. The shift range switching apparatus according to claim 1, further comprising an abnormality handling section configured to perform an abnormality handling operation to hold the shift range of the automatic transmission at a drive range, make an indication to induce the vehicle driver to stop the vehicle and operate a parking brake of the vehicle, and stop an engine of the vehicle after the parking brake is applied when the abnormality determination section determines that the drive section is abnormal.

6. The shift range switching apparatus according to claim 1, wherein, when the shift range is at a drive range, the abnormality detection condition is set on the basis of at least one of a speed of the vehicle, an engine load of the vehicle, an opening degree of a throttle valve of the vehicle, and whether or not the vehicle is running on an expressway.

7. The shift range switching apparatus according to claim 6, further comprising an abnormality handling section configured to perform an operation to hold the shift range of the automatic transmission at a drive range, and make an indication to induce the vehicle driver to stop the vehicle and operate a parking brake of the vehicle when the abnormality determination section determines that the drive section is abnormal.

8. The shift range switching apparatus according to claim 1, wherein the abnormality detection section is activated at each elapse of a predetermined abnormality detection time.

9. The shift range switching apparatus according to claim 1, wherein the abnormality determination section is activated after an elapse of a predetermined abnormality determination time since the abnormality detection section starts performing the abnormality detecting operation.

10. The shift range switching apparatus according to claim 1, wherein the drive section is an electric motor, and the abnormality detection section is configured to cause the drive section to rotate by a target rotation amount which is larger than an amount of rotation caused due to backlash between a motor shaft and a stator of the electric motor and does not cause the shift range to be changed.

11. The shift range switching apparatus according to claim 1, wherein the shift range switching apparatus is used in a shift-by-wire system.

* * * * *